Dec. 20, 1960 K. E. SNYDER 2,965,207
PISTON TRAVEL CONTROLLING MECHANISM
Filed June 24, 1957 2 Sheets-Sheet 1
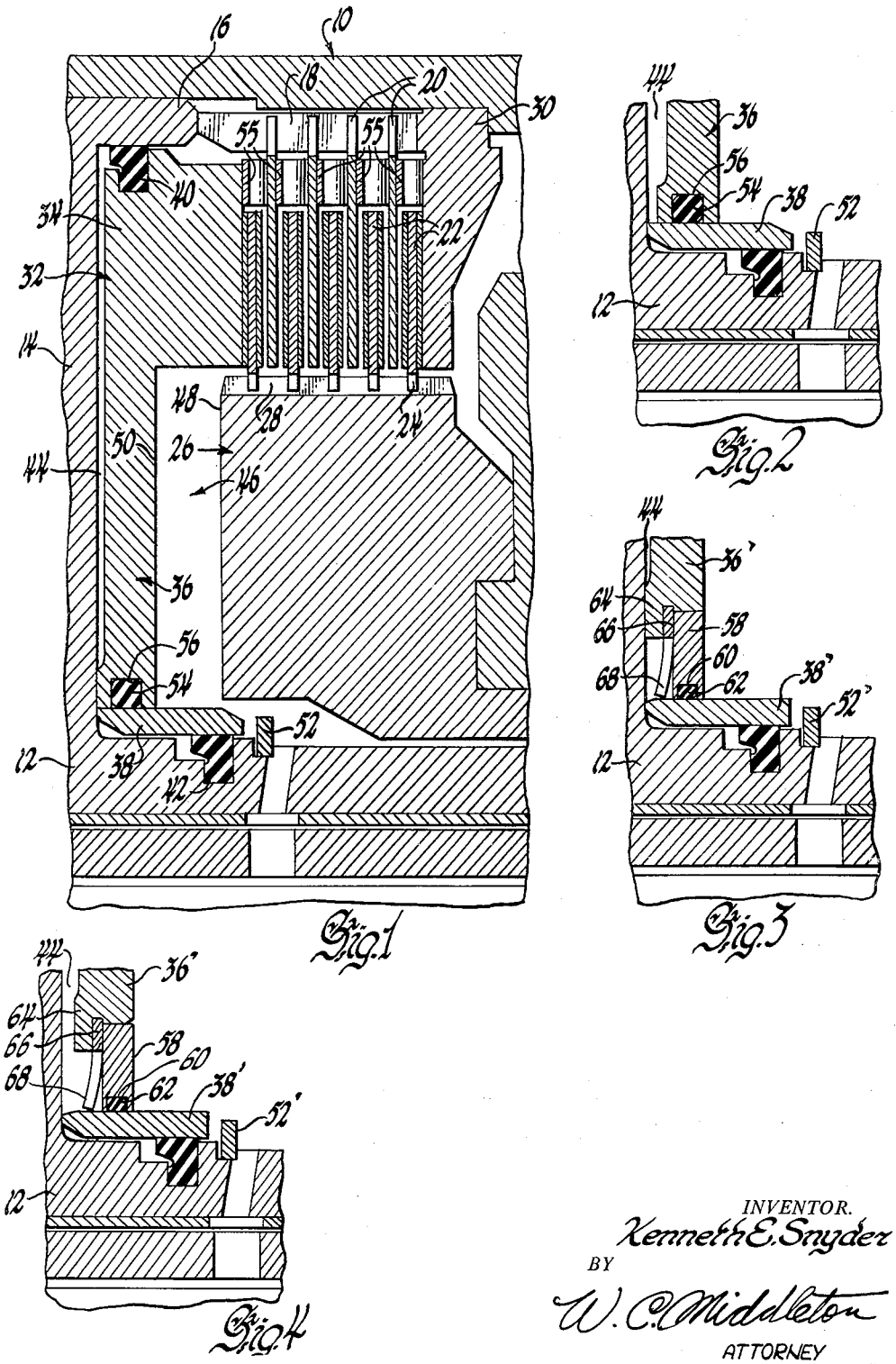
INVENTOR.
Kenneth E. Snyder
BY
W. C. Middleton
ATTORNEY Dec. 20, 1960  K. E. SNYDER  2,965,207
PISTON TRAVEL CONTROLLING MECHANISM
Filed June 24, 1957  2 Sheets-Sheet 2

INVENTOR.
Kenneth E. Snyder
BY
W. C. Middleton
ATTORNEY

United States Patent Office 2,965,207
Patented Dec. 20, 1960

2,965,207
PISTON TRAVEL CONTROLLING MECHANISM

Kenneth E. Snyder, Northville, Mich., assignor to General Motors Corporation, Detroit, Mich., a corporation of Delaware Filed June 24, 1957, Ser. No. 667,562

11 Claims. (Cl. 192—111)

This invention relates to a piston travel regulator.

In the present day process of mass production of interchangeable clutch plates for use in automatic transmission clutch stacks, it frequently occurs that there are variations in manufacture of the clutch plates. Since the clutch plates when installed in a new transmission, or when they are being replaced, are apt to be slightly different in overall width, the distance that the piston actuating the plates has to travel to engage the clutch will vary. Therefore, because the timing of the engagement of the clutches is very important with reference to the operation of the transmissions, these differences in travel of the piston may affect the time of engagement to a degree wherein some of the clutches will engage prematurely thereby creating wear, whereas other of the clutches will not be engaged fast enough thereby permitting engine run-away. Also, since the pistons are normally designed for a specified travel to engage the clutch, variations in clutch tolerances or wear of the plates may cause the clutch to be engaged with a resounding slap thereby creating an undesirable jerking effect.

Therefore, it is an object of this invention to provide a piston with regulator means to compensate for the variations in manufacture of the clutch plates and to compensate for wear of the clutch plates in service.

It is a further object of this invention to provide a piston with separable parts so as to regulate the travel of the piston to a specified amount regardless of wear or variations in manufacture of the clutch plates.

It is a further object of this invention to provide a clutch piston with movable parts for adjustment of the piston to provide an engaging or operating stroke equal to travel to the return stroke regardless of wear of the plates or variations in manufacture of the clutch plates.

Figure 5:
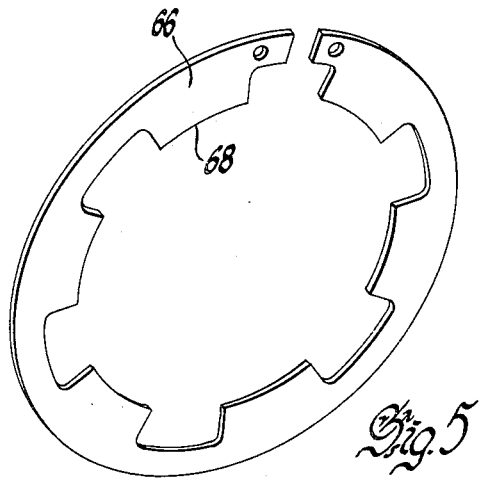
Figure 6:
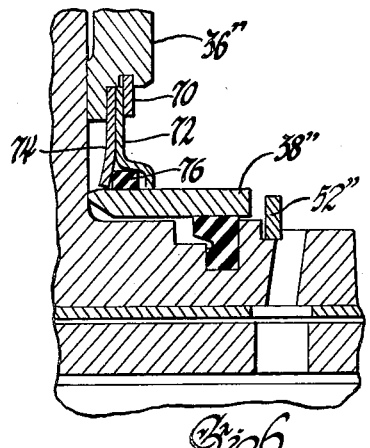
Figure 7:
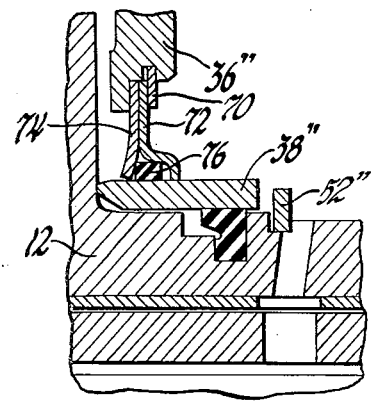
Figure 8:
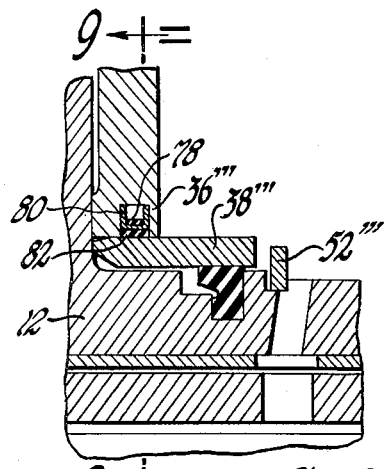
Figure 9:
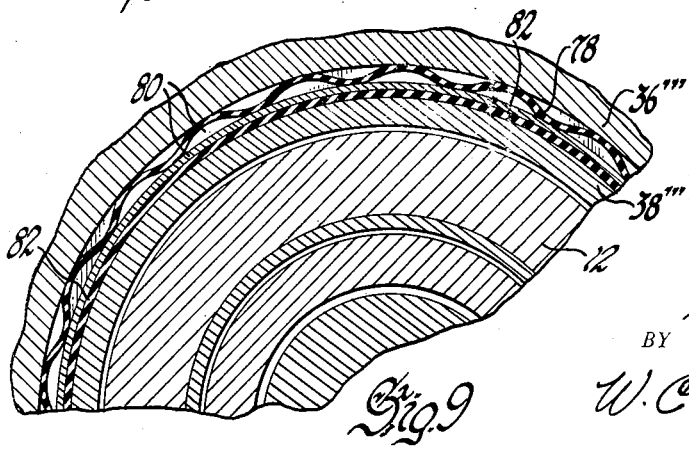

Other features, advantages and objects will become apparent by reference to the detailed description of the invention and to the drawings wherein:

Figure 1 is a cross-sectional view of the upper half of a clutch embodying this invention and showing the clutch piston regulator means in one position, Figure 2 is a partial sectional view corresponding to Figure 1 showing the piston regulator in an adjusted position, Figure 3 is a partial cross-sectional view of a modification of the piston regulator of Figure 1, Figure 4 is a partial cross-sectional view corresponding to Figure 3 showing the regulator in an adjusted position, Figure 5 is a perspective view of the frictional engaging regulator means of Figures 3 and 4, Figure 6 is another modification of the piston regulator of Figures 1 and 2, Figure 7 is a view corresponding to Figure 6 showing the regulator in an adjusted position, Figure 8 is another modification of the piston regulator of Figure 1, and Figure 9 is a view of the piston regulator of Figure 8 looking in the direction of arrows 9—9 of Figure 8.

Referring now to the drawings and more particularly to Figure 1, wherein there is shown a clutch 10 having a driving shaft 12 with a vertical portion 14 and a parallel portion 16 internally splined at 18 to receive a plurality of externally splined friction disk clutch plates 20 adapted to mate with a plurality of friction disk clutch plates 22 internally splined at 24 to a driven member 26 externally splined at 28.

Parallel portion 16 is also formed with a vertically depending portion member 30 acting as a backing portion for the clutch stack.

While the clutch 10 is shown as having a driving member 12 and a driven member 26, it will be obvious that either of the drive or driven members could be stationary so as to provide a brake to prevent rotation of the members instead of a clutch as described for connecting the two members for unitary rotation.

Suitably disposed within the U-shaped housing formed by the driving member 12 and its extensions in a piston member 32 having an enlarged portion 34 adapted to be positioned adjacent the clutch stack for actuation thereof and a vertical depending body portion 36 extending into contact with and slidably supported upon a hub portion 38 rotatably supported upon the drive shaft 12. Lip seals 40 and 42 are provided between the piston 32 and the drive shaft 12 and its extension 16 to prevent the communication of oil between an oil space 44 and a cavity 46 defined by the adjacent sides 48 and 50 of the driven member 26 and piston 32, respectively. The body portion 34, 36 of the piston 32 is normally adapted to be moved by fluid pressure in pocket 44 with the hub member or portion 38 to engage the clutch plates.

The means connecting the body portion 34, 36 and the hub 38 is the subject of this invention and as shown in Figure 1 consists of an elastic deformable material 54 such as a phenolic compound squeezed or compressed into a cavity 56 of the body portion 36 to frictionally engage both the body portion 36 and the hub member 38 with enough pressure for normally causing simultaneous movement of the body portion 36 and hub 38, but permitting relative movement therebetween.

Upon actuation of the piston 32 by fluid pressure in pocket or space 44 to engage the clutch plates, the piston body portion 36 and hub 38 will be moved in a direction to the right as seen in Figure 1, until hub 38 is stopped in its movement by a snap-ring stop means 52. Normally, the piston would be designed to have a travel so that upon hub 38 abutting stop 52, the clutch plates would be engaged. However, due to variations in manufacture and also due to wear of the clutch plates in service, this is not always true. Therefore, the construction shown in Figure 1, i.e., with the use of the frictional abutting material 54 yieldingly connecting the two portions, permits the body portion 36 to be moved further to the right to engage the clutch plates even after the hub 38 has been stopped. Thereafter, upon release of the fluid pressure in pocket 44, suitable wave springs 55 will act on the plates 20 and the body portion 36 to return the piston to its normal position. In its return stroke, the piston 32 will move to the left as seen in Figure 1 with the hub 38 moving therewith because of the frictional pressure of material 54 until the hub is stopped by the edge of the housing as defined by the drive shaft portion 14. The body portion 36 will then also be simultaneously stopped because of the resistance offered by the material 54, and an adjusted position of the body portion 36 will be reached as shown in Figure 2. With the body portion 36 of the piston in this adjusted position, the piston 32 will have an operating stroke equal in travel to that of its return stroke, and the clutch plates will be engaged when hub 38 is stopped by stop 52, thereby permitting the actuation of the clutch through the same predetermined time interval as intended when the clutch plates were originally designed or new, thereby eliminating improper function and timing of the clutch application.

Referring now to Figures 3, 4 and 5 of the drawings, there is shown therein a modification of the piston travel regulator means shown in Figure 1. In place of the piston body portion 36 abutting the hub portion 38, a body portion 36' is press fitted with an annular ring-like member 58 abutting at its inner periphery the hub member 38'. Within a suitable recess 60 abutting the hub 38' is provided an annular oil sealing member 62 to prevent the escape of oil from pocket 44 into cavity 46. Fitted between an overhanging flange portion 64 of the body portion 36' and the annular member 58 is an annular ring-like spring member 66, as seen in Figure 5, having its inner periphery prestressed and bent at 68 and frictionally abutting the hub 38' for normally causing simultaneous movement of hub portion 38' with body portion 36' but permitting relative sliding movement between the two portions upon stoppage of hub 38' by abutting with stop means 52'.

The operation of this modification is the same as that of Figures 1 and 2 in that movement of piston 32 by fluid pressure in pocket 44 will move both portions 36' and 38' simultaneously until hub 38' is stopped by the stop means 52', whereupon body portion 36' will continue to move to the right as seen in Figures 3 and 4, until the clutch plates have been engaged. Return movement of the hub and body portions will be made simultaneously by the frictional engagement of the spring-like abutting portion 68 until the hub 38' is stopped by the edge of the housing portion 14, whereupon the piston body portion 36' will be in its adjusted position.

A further modification of the piston travel regulator is shown in Figures 6 and 7 wherein the body portion 36" is provided with an annular snap-ring 70 axially confining a plurality of ring-like spring members 72 and 74 of slightly different configurations and having their inner peripheries frictionally abutting the hub portion 38" for yieldingly connecting the body portion 36" and hub portion 38" together for simultaneous movement. An annular oil seal 76, which in this case is made of rubber and cork, is also provided between the inner peripheries of the spring members 72 and 74 for preventing leakage of oil from pocket 44 into cavity 46.

The operation of this modification is again similar to the modifications previously described and, as shown in Figure 7, the adjusted position of the piston regulator is brought about by the continued movement of the body portion 36" to engage the clutch plates by sliding upon the hub 38", with a simultaneous return movement of portions 36" and 38".

Referring now to another modification of the piston travel regulator as shown in Figures 8 and 9, the friction seal member 54 of Figures 1 and 2 could be replaced with an annular wave spring member 78 molded of rubber or similar suitable elastic material and fitted within a split U-shaped thin metallic ring 80 abutting an annular seal 82. The operation of this modification would be the same as previously described in connection with Figures 1 and 2 with the wave spring supplying sufficient compression to cause frictional engagement between the body and hub portions 36''' and 38''', respectively.

Therefore, to summarize, in the general operation of this device, as previously described, upon exact manufacture of the clutch plates or disks, engagement of the plates by movement of the piston 32 will be accomplished by movement of the body portion 36 and 38 in Figure 1 to the point where hub 38 engages stop means 52. However, because of variations in manufacture and because of wear of the plates in service, the clutch plates may not be engaged at this time. In this case, body portion 36 will continue to be moved by fluid pressure because of the yielding connection 54 between the two members of the piston until the clutch plates are engaged. Upon a return movement of the piston 32 by the springs 55 to disengage the clutch, the frictional material 54, and likewise the ring-like spring members 68 in Figures 3 and 4, members 72 and 74 in Figures 6 and 7, and wavy spring 78 in Figure 8, will exert enough frictional resistance to the relative movement of the two portions to cause simultaneous movement of the two portions to the positions shown in Figure 2, whereupon the piston body portion will now be in an adjusted position permitting an equal distance of travel of the piston to an engaged position and a return position. This also permits the engagement of the clutch on subsequent applications by the same volume of oil in chamber pocket 44.

From the foregoing it will be seen that applicant has provided a clutch actuating piston having a controlled stroke that can be regulated to provide a constant travel to engage and disengage the clutch regardless of the variations in width of a clutch stack due to variations in manufacture of the clutch disks and wear of the clutch disks in service. Therefore, it will be seen that applicant has provided a clutch piston regulator that will permit the timing of clutch engagement to be accurately determined prior to insertion of the clutch into an automatic transmission, and permitting the constant accurate operating performance of the clutch regardless of wear of the plates or variations in manufacture of the plates. Also, it will be seen that applicant has provided a novel and efficient piston travel regulator requiring a minimum of service and one that is operative without outside adjustments for the life of the clutch stack. It will be understood that the invention can be modified beyond the illustrated embodiments, and therefore, any limitations to be imposed are those set forth in the following claims.

I claim:

1. A fluid pressure actuating mechanism comprising a housing, a piston in said housing adapted to be moved in one direction by fluid pressure, means biasing said piston in the opposite direction, said piston having a body portion and a hub portion, said body portion extending radially from and being supported upon said hub portion, said portions being slidable with respect to each other, and frictional engaging means between said portions for yieldingly connecting said portions for movement together, stop means for limiting the movement of said hub portion, said portions being moved by said fluid pressure until said hub portion is arrested by said stop means, said yielding connection between said portions permitting further movement of said body portion, said yielding engaging means permitting the return movement of said portions by said biasing means without relative movement of said portions with respect to each other.

2. A clutch comprising a driving clutch member, a driven clutch member, and means for engaging said members, said means comprising a piston, said piston adapted to be moved in one direction for engaging said clutch, said piston being movable in the opposite direction to disengage said clutch, said piston having a body portion and a hub portion, said body portion extending radially from and being supported on said hub portion, said portions being slidable with respect to each other, and frictional engaging means between said portions yieldingly connecting said portions for movement together, stop means for said hub portion, movement of said body portion in a clutch engaging direction causing movement of said hub portion until arrested by said stop means, said yielding means permitting further movement of said body portion relative to said hub portion to engage said clutch, said yielding means causing movement together of said portions upon movement of said body portion in a clutch disengaging direction.

3. A clutch comprising a driving clutch member, a driven clutch member, and means for engaging said members, said means comprising a piston being movable through an operating stroke in one direction to engage said members and movable through a return stroke in the opposite direction to disengage said members, said piston having a body portion and a hub portion, said body portion extending radially from and being supported upon said hub portion, said portions being slidable with respect to each other, and friction engaging means between said portions permitting relative sliding movement therebetween during said operating stroke, stop means for arresting the movement of said hub portion during movement of said piston through its operating stroke, said friction engaging means preventing relative motion between said portions during said return stroke.

4. A clutch comprising a driving clutch member, a driven clutch member, and means for engaging said members, said means comprising a piston movable in one direction to engage said members and movable in the opposite direction to disengage said members, said piston having a body portion and a hub portion, said body portion extending radially from and being supported upon said hub portion, said portions being slidable with respect to each other, and connecting means between said portions permitting relative sliding motion between said portions in one direction of movement of said piston while preventing relative motion between said portions upon movement of said piston in the opposite direction.

5. A clutch as in claim 4 wherein said connecting means comprises a deformable ring frictionally engaging said portions.

6. A clutch as in claim 4 wherein said connecting means comprises an annular ring-like spring plate having its outer periphery fixed to said body portion with its inner periphery prestressed and bent for a biased frictional abutting engagement with said hub portion.

7. A clutch comprising a driving clutch member, a driven clutch member, and means for engaging said members, said means comprising a piston movable through an operating stroke in one direction to engage said members and movable through a return stroke in the opposite direction to permit the disengagement of said members, said piston having a hub portion and a body portion extending radially from and being supported upon said hub portion, said portions being slidable axially with respect to each other, and means frictionally connecting said portions for normally preventing relative sliding movement therebetween, stop means for stopping axial movement of said hub portion during movement of said piston through its operating stroke, said body portion being movable relative to said hub portion to engage said members after the stopping of said hub portion by said stop means, said connecting means causing a unitary movement of said portions through the return stroke of said pistons to define a specified travel of the piston, the relative sliding movement of said portions adjusting the operating stoke to be equal to the return stroke regardless of wear of the clutch members in service.

8. A clutch as in claim 7 wherein said friction connecting means comprises an elastic deformable sealing member frictionally engaged by said body and hub portions.

9. A clutch as in claim 7 wherein said friction connecting means comprises an annular ring having its outer periphery attached to said body portion, with its inner periphery bent so as to be biased into frictional abutting engagement with said hub portion.

10. A clutch as in claim 7 wherein said connecting means includes a plurality of annular ring flange members attached at their outer peripheries to said body portion, with their inner peripheries frictionally abutting said hub porton, and a fluid sealing member positioned between said ring flange members for slidable movement by said flanges with said body portion.

11. A clutch as in claim 7, wherein said connecting means includes a wave spring and a sealing member, said wave spring being confined within said body portion and acting in compression on said sealing member, said sealing member abutting said hub portion.

References Cited in the file of this patent

UNITED STATES PATENTS

| | | |
|---|---|---|
| 2,174,316 | Dunkelow | Sept. 26, 1939 |
| 2,392,970 | Bricker | Jan. 15, 1946 |
| 2,536,269 | Driscoll | Jan. 2, 1951 |
| 2,551,253 | Du Bois | May 1, 1951 |
| 2,568,858 | Kovac | Sept. 25, 1951 |
| 2,746,254 | Lucien | May 22, 1956 |
| 2,801,712 | Lockhart | Aug. 6, 1957 |
| 2,814,366 | Lucien | Nov. 26, 1957 |

UNITED STATES PATENT OFFICE
CERTIFICATION OF CORRECTION

Patent No. 2,965,207            December 20, 1960

Kenneth E. Snyder

It is hereby certified that error appears in the above numbered patent requiring correction and that the said Letters Patent should read as corrected below.

Column 2, line 18, for "in" read -- is --; column 6, line 9, for "pistons" read -- piston --.

Signed and sealed this 6th day of June 1961.

(SEAL)
Attest:

ERNEST W. SWIDER            DAVID L. LADD
Attesting Officer            Commissioner of Patents